United States Patent [19]

Stringer et al.

[11] Patent Number: 5,165,747
[45] Date of Patent: Nov. 24, 1992

[54] ADHESIVE MOLDING STRIPS FOR A VEHICLE CARGO BED

[75] Inventors: Charles E. Stringer, Deckerville; Brian W. Glombowski, North Street, both of Mich.

[73] Assignee: Masco Industries, Inc., Taylor, Mich.

[21] Appl. No.: 600,382

[22] Filed: Oct. 19, 1990

[51] Int. Cl.⁵ .............................................. B60R 13/01
[52] U.S. Cl. .................... 296/41; 296/39.2; 293/128; 280/770
[58] Field of Search ............ 296/41, 39.1, 39.2, 296/207; 293/128; 280/770

[56] References Cited

U.S. PATENT DOCUMENTS

| | | |
|---|---|---|
| 2,143,285 | 1/1939 | Schofield . |
| 3,572,798 | 3/1971 | Kunevicius .............. 280/770 X |
| 3,578,375 | 5/1971 | Finefrock . |
| 3,777,438 | 12/1974 | Brown . |
| 3,856,194 | 12/1974 | Helm . |
| 3,912,325 | 10/1975 | Sudyk . |
| 4,227,718 | 10/1980 | Durben ...................... 280/770 |
| 4,245,863 | 1/1981 | Carter . |
| 4,360,549 | 11/1982 | Ozawa et al. . |
| 4,396,219 | 8/1983 | Cline . |
| 4,542,926 | 9/1985 | Treber et al. ............. 280/770 X |
| 4,763,945 | 8/1988 | Murray . |
| 4,909,559 | 3/1990 | Zettle ........................... 296/41 |
| 4,974,892 | 12/1990 | Huard ...................... 280/770 X |
| 4,974,895 | 12/1990 | Davenport ................ 296/39.2 |

FOREIGN PATENT DOCUMENTS

| | | | |
|---|---|---|---|
| 3151520 | 7/1983 | Fed. Rep. of Germany ........ 296/41 |
| 191273 | 8/1987 | Japan ............................. 296/39.1 |

OTHER PUBLICATIONS

J. C. Whitney and Co., Jul. 1, 1986, page 47.

Primary Examiner—Margaret A. Focarino
Assistant Examiner—Joseph D. Pape
Attorney, Agent, or Firm—Edgar A. Zarins; Malcolm L. Sutherland

[57] ABSTRACT

Adhesive molding strips for protection of a vehicle body particularly the side wheel wells and the interior bed of a pickup truck. The molding strips include an adhesive layer which facilitates permanent application of the strips to the vehicle body for protection against dents and other damage. In a pickup truck, the strips are applied to the longitudinal ribs formed in the bed floor, side walls and tailgate thereby protecting against damage while facilitating evaporation of accumulated water. As molding for wheel wells and the like the strips are readily deformable to follow the curvature of the wheel well. The strips are formed of a resilient material which assumes its original configuration upon indentation.

8 Claims, 1 Drawing Sheet

U.S. Patent    Nov. 24, 1992    5,165,747
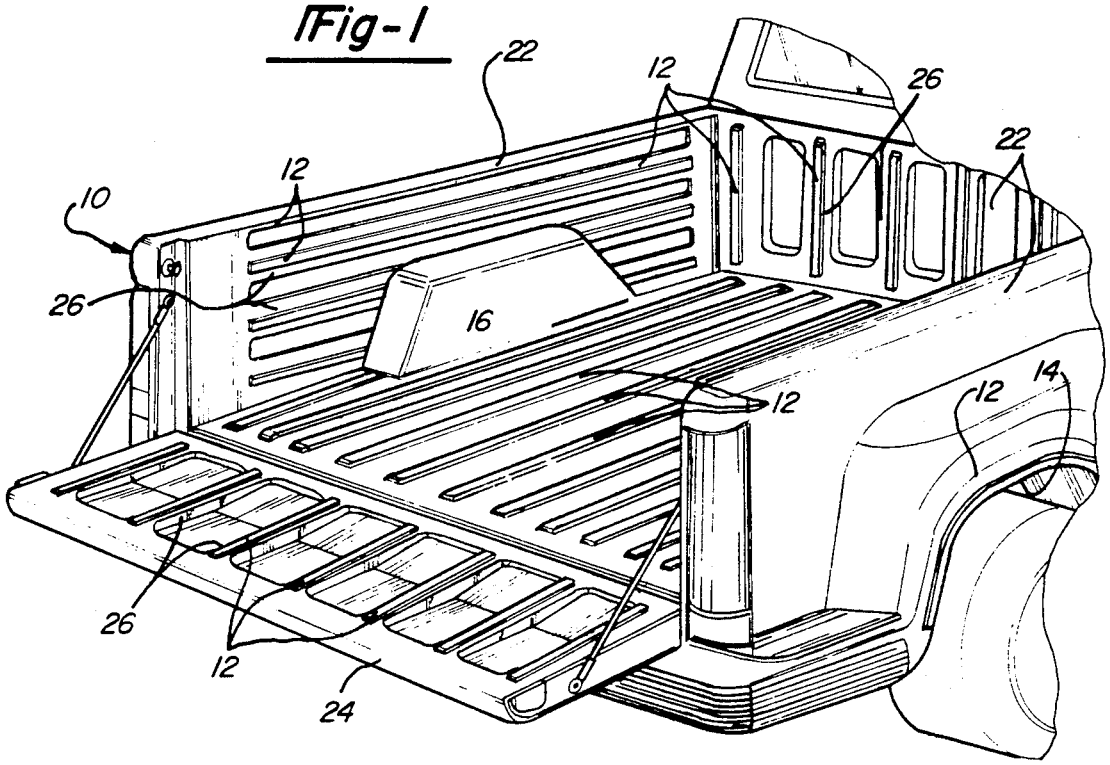
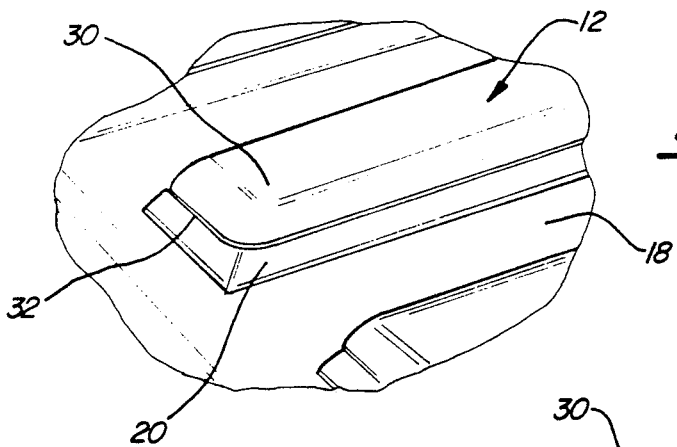

ADHESIVE MOLDING STRIPS FOR A VEHICLE CARGO BED

BACKGROUND OF THE INVENTION

I. Field of the Invention

This invention relates to protective molding for vehicles and, in particular, to an adhesive molding strip which can be applied to a truck bed or side panels of a vehicle to protect the surface against impact.

II. Description of the Prior Art

A wide range of materials and components have been utilized to prevent damage of vehicle surfaces. Wheel well rims are susceptible to damage because of their outwardly extending edge. Because of their utilitarian nature, the cargo beds of pickup trucks are even more susceptible to scratches and dents as cargo is loaded and unloaded. In addition to detracting from the appearance of the vehicle, each scratch and dent induces rust and corrosion of the vehicle body. Modern vehicles are provided with various molding to protect the vehicle surface.

With the strength and resiliency of modern plastics, full bed liners have become very popular for protecting the cargo bed. These bed liners are in the form of an integral basin which fits into the cargo bed and includes a floor and side walls. Typically, the bed liner is fitted to the cargo bed and secured thereto. As a result, cargo is prevented from engaging the vehicle surface. However, the bed liner and vehicle surface have a space formed therebetween which can retain moisture causing the surface to corrode. Furthermore, in order to retain the liner within the bed the entire bed must be covered increasing the expense. More recently, spray-on bed liners have been developed which adhere directly to the surface of the bed. Although preventing moisture from contacting the vehicle surface the spray-on liners seal the bed resulting in an accumulation of water. Moreover, such liners are difficult to replace if they become damaged or worn.

Typical side molding for vehicles is attached using fasteners such as screws or clips to secure the molding directly to the vehicle surface. In wheel wells, the molding is attached to the edge for protection thereof against dents from car doors and the like. Alternatives include molding which includes a slit to fit over the rim edge of the well. The time and hardware needed to secure the side molding increases manufacturing cost. Moreover, prior known molding systems are not conducive to attachment by the vehicle owner because of the special sizing and tools.

SUMMARY OF THE PRESENT INVENTION

The present invention overcomes the disadvantages of the prior known protective systems by providing an adhesive molding strip which can be readily applied to cargo beds and wheel wells to provide protection of the vehicle surface.

The present invention generally comprises an elastomeric strip having an adhesive backing for adherence to various surfaces of the vehicle. The molding strips are pliable and deformable to follow the contours of the vehicle surface including the rim of a vehicle wheel well. For application to the edge of the wheel well, a predetermined length of molding strip is cut off from the bulk roll. After removing the protective liner the strip is applied to the edge of the wheel well following the perimeter by bending the molding material. The backing adhesive maintains the position of the molding while its elastomeric properties absorb any impacts returning to its original configuration.

In a truck cargo bed, the molding strips are applied to the longitudinal ridges formed in the bed and the tailgate to prevent cargo from coming into contact with the vehicle surface. Of course, the strips can be applied to a flat bed also thereby forming a raised cargo surface. By leaving a majority of the cargo bed exposed moisture will not accumulate. Yet the vehicle surface is protected from contact with the cargo prolonging the aesthetic and useful life of the vehicle.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a vehicle having the adhesive molding strips of the present invention mounted to the cargo bed and wheel well of the vehicle;

FIG. 2 is an elevated perspective of the molding mounted to the raised ridges of the cargo load; and FIG. 3 is an end view of the molding strip mounted to the raised ridge of the cargo bed.

DETAILED DESCRIPTION OF A PREFERRED EMBODIMENT OF THE PRESENT INVENTION

Referring now to FIG. 1, there is shown a motor vehicle 10 in the form of a pickup truck with the adhesive molding strips 12 of the present invention applied to critical areas of the vehicle 10. Typical applications of the molding strips 12 include as a protector for the rim 14 of the wheel well and within the cargo bed 16 of the truck 10. Although the molding strip 12 is shown adhered to several surfaces of the vehicle 10, it is to be understood that it may not be desirable to apply the strips 12 to one or more of these areas for practical or aesthetic reasons. However, the adhesive molding strips 12 have sufficient adhesive and impact strength to be used on almost any surface of the vehicle.

Referring now to FIGS. 1 through 3, the adhesive molding strips 12 of the present invention are conveniently applied to the cargo bed 16 of a vehicle 10 to reduce impact damage. In many truck cargo beds 6, the floor 18 is provided with a plurality of parallel ridges 20 formed therein. The ridges 20 are designed to raise the cargo above the floor 18 of the bed 16. The molding strips 12 are mounted on top of the ridges 20 in parallel alignment to further raise the cargo. Furthermore, the cargo is prevented from contacting the floor 18. However, because the strips 12 are disposed in spaced apart relation any accumulated moisture will drain or evaporate from the floor 18 of the cargo bed 16. Additionally, the molding strips 12 can be mounted to the side walls 22 and tailgate 24 of the cargo bed 16 for protection against impact damage as shown in FIG. 1. The strips 12 may be mounted to ribs 26 formed in the surface or simply to a planar surface if such is provided.

The adhesive molding strips 12 comprise an extruded elastomer material 30 backed by an adhesive layer 32. In a preferred embodiment, the strips 12 are supplied in a continuous roll whereby appropriate lengths can be simply cut from the roll. A release liner initially secured to the adhesive layer 32 retains the adhesive properties of the layer 32 by preventing an accumulation of dirt and dust. Once an appropriate length of molding strip 12 is removed from the bulk supply, the release liner is removed and the strip 12 is applied to the vehicle surface, preferably the raised ridges 20 of the cargo bed 16 and pressed in place. The adhesive layer 32 prevents the molding strip 12 from shifting or detaching from the vehicle surface. The elastomeric material 30 of the strip 12 will retain its configuration even following impact yet is sufficiently elastic to cushion the cargo.

Additional applications for the adhesive molding strip 12 include side molding for the vehicle 10 to prevent dents from adjacent vehicles. The adhesive strips 12 can be used as molding from the rim 14 of the vehicle wheel well. The adhesive layer 32 securely adheres the molding to the vehicle surface. In prior known molding systems, the molding is preformed to the configuration of the wheel well. As a result, numerous different molding assemblies must be stocked to accommodate the different vehicle models. The present invention eliminates the need to stock different configurations since the molding strips 12 can be bent to follow the rim of the wheel well 14. The user merely cuts off the required length of molding 12 and carefully applies it to the rim 14. The elasticity of the molding 12 allows it to be bent laterally without deformation while the adhesive will maintain the molding strip 12 on the wheel well 14 in the desired configuration. Thus, a single bulk quantity of the molding strip 12 will allow a user to protect multiple surfaces of a vehicle.

The foregoing detailed description has been given for clearness of understanding only and no unnecessary limitations should be understood therefrom as some modifications will be obvious to those skilled in the art without departing from the scope and spirit of the appended claims.

What is claimed is:

1. A protective molding for adhesive mounting within a cargo bed of a vehicle, said molding comprising:

a resiliently elastic elongated molding body having an outer impact surface, an inner surface, and side surfaces extending between said outer and inner surface thereby spacing said outer impact surface from said inner surface for impact adsorption; and an adhesive layer applied to said inner surface of said molding body for fixedly mounting said molding within the cargo bed of the vehicle to protect the cargo bed surface from impact damage;

said molding forming a plurality of strips adhesively mounted within the cargo bed for resiliently absorbing impact while being deformable to conform to non-linear surfaces of the cargo bed.

2. The molding as defined in claim 1 wherein said molding body is formed of an extruded elastomer as a continuous elongated member, said plurality of strips formed from said continuous elongated member.

3. The molding as defined in claim 1 wherein said molding strips are adhesively mounted within said cargo bed in spaced-apart parallel relation to form an impact surface within the cargo bed.

4. The molding as defined in claim 3 wherein said cargo bed includes a plurality of spaced-apart ridges extending longitudinally within said bed, said molding strips adhesively mounted to an upper surface of said ridges.

5. In a vehicle having a cargo bed with a load-bearing surface, the improvement comprising:

a plurality of molding strips adhesively mounted to said load-bearing surface in spaced-apart parallel relation to form an impact surface within said cargo bed, said molding strips extending longitudinally within said cargo bed and including a resilient elastic elongated molding body having an impact surface spaced from said load-bearing surface for impact absorption and an adhesive layer for fixedly mounting said molding strips in spaced-apart parallel relation directly to said load-bearing surface of said cargo bed, said cargo bed being exposed between said spaced-apart molding strips such that said impact surface formed by said molding strip absorbs any impact load of cargo inserted within said cargo bed.

6. The molding strip as defined in claim 5 wherein said cargo bed includes a plurality of parallel ridges spaced-apart within said bed, said molding strips being adhesively mounted to an outer surface of said parallel ridges.

7. The molding strips as defined in claim 6 wherein said cargo bed includes side walls and a selectively deployable tailgate, said molding strips being adhesively mounted to said walls and tailgate in spaced-apart parallel relation to prevent impact damage.

8. In a vehicle having a cargo bed with a load-bearing surface, said cargo bed surface having a plurality of spaced-apart parallel ridges, the improvement comprising:

a plurality of molding strips mounted to said ridges of said cargo bed in spaced-apart parallel relation to form an impact surface spaced from cargo bed surface, said molding strips including a resiliently elastic elongated molding body and an adhesive layer for fixedly mounting said molding strips to said ridges whereby said cargo bed is exposed between said spaced-apart molding strips, said impact surface formed by said molding strips absorbing any impact load of cargo inserted within said cargo bed.

* * * * *